(12) United States Patent
Olie et al.

(10) Patent No.: US 11,475,716 B2
(45) Date of Patent: Oct. 18, 2022

(54) DOME MULTI-BIOMETRIC SCANNER

(71) Applicant: Securiport LLC, Washington, DC (US)

(72) Inventors: Roberto Leandro Olie, Washington, DC (US); Enrique Segura, Washington, DC (US)

(73) Assignee: SECURIPORT LLC, Washington, DC (US)

( * ) Notice: Subject to any disclaimer, the term of this patent is extended or adjusted under 35 U.S.C. 154(b) by 8 days.

(21) Appl. No.: 16/854,185

(22) Filed: Apr. 21, 2020

(65) Prior Publication Data

US 2020/0387725 A1 Dec. 10, 2020

Related U.S. Application Data

(63) Continuation of application No. 15/897,098, filed on Feb. 14, 2018, now Pat. No. 10,628,692.

(60) Provisional application No. 62/458,734, filed on Feb. 14, 2017.

(51) Int. Cl.

| | |
|---|---|
| *G06V 40/70* | (2022.01) |
| *G10L 17/06* | (2013.01) |
| *G10L 17/22* | (2013.01) |
| *G10L 17/10* | (2013.01) |
| *G10L 17/00* | (2013.01) |
| *G06V 40/13* | (2022.01) |
| *G06V 40/12* | (2022.01) |

(52) U.S. Cl.
CPC .......... *G06V 40/70* (2022.01); *G06V 40/1306* (2022.01); *G06V 40/1365* (2022.01); *G10L 17/00* (2013.01); *G10L 17/06* (2013.01); *G10L 17/10* (2013.01); *G10L 17/22* (2013.01)

(58) Field of Classification Search
CPC ............. G06K 9/00892; G06K 9/0002; G06K 9/00087; G10L 17/10; G10L 17/005; G10L 17/06; G10L 17/22; G10L 17/00; G06V 40/70; G06V 40/1306; G06V 40/1365
USPC ........ 382/124, 125, 126, 116, 118, 117, 115, 382/305, 209, 306
See application file for complete search history.

(56) References Cited

U.S. PATENT DOCUMENTS

| | | | |
|---|---|---|---|
| 8,866,347 B2* | 10/2014 | Benkley, III | ....... G06K 9/00053 307/116 |
| 9,245,175 B1 | 1/2016 | Vladimir | |
| 9,412,203 B1* | 8/2016 | Garcia, III | .............. G06T 13/00 |
| 9,486,074 B2* | 11/2016 | Garg | .................. G06K 9/00033 |
| 10,028,794 B2* | 7/2018 | Cagle | ..................... A61B 34/74 |
| 10,305,895 B2* | 5/2019 | Barry | ................. G06K 9/00892 |
| 2011/0286641 A1* | 11/2011 | Schneider | .......... G06K 9/00046 382/124 |

(Continued)

*Primary Examiner* — Sheela C Chawan
(74) *Attorney, Agent, or Firm* — Miles & Stockbridge P.C.

(57) ABSTRACT

A multi-function biometric scanner is provided. The multi-function biometric scanner includes a housing that includes a dome-shaped or semi-dome shaped user interface, the user interface including a capacitive film for fingerprint capture that is disposed along an outer-surface of the housing and a plurality of biometric sensors that are disposed within the housing and that are configured to concurrently retrieve a plurality of biometrics from a user, each sensor being configured to measure a respective biometric of the plurality of biometrics. Fingerprints and the plurality of biometrics are compared to threat information in one or more threat databases to identify a person of interest.

16 Claims, 5 Drawing Sheets

(56) References Cited

U.S. PATENT DOCUMENTS

2016/0283703 A1* 9/2016 Allyn .................... G06F 21/32
2017/0091515 A1* 3/2017 Cao ...................... H01H 13/86
2019/0050622 A1* 2/2019 Cabibihan ............. A61B 5/117

* cited by examiner

400

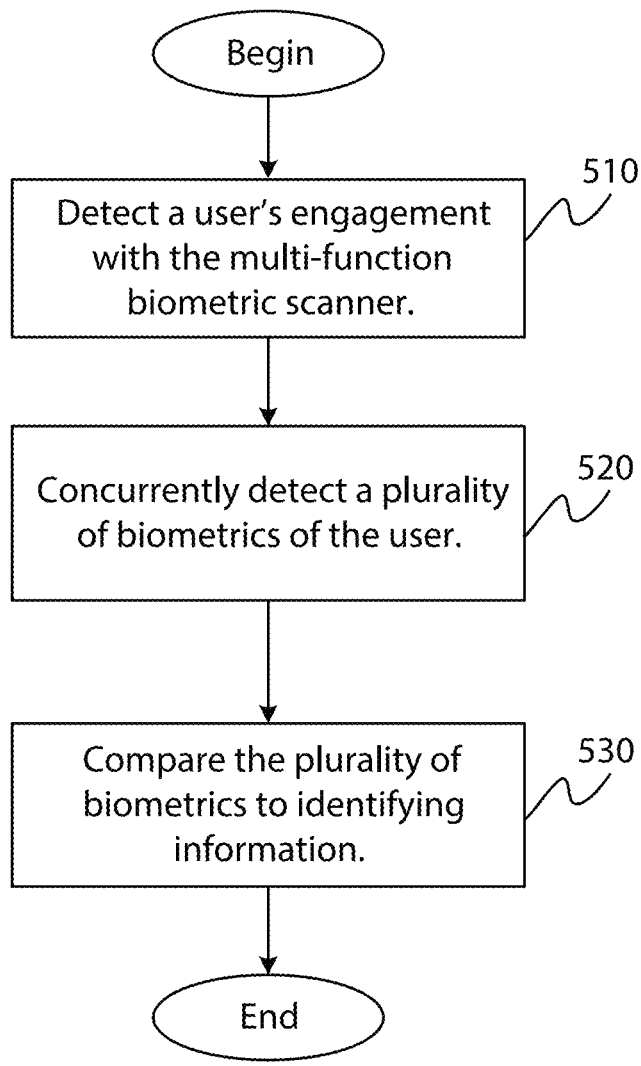

DOME MULTI-BIOMETRIC SCANNER

PRIORITY APPLICATION

This application is a continuation of U.S. patent application Ser. No. 15/897,098, filed on Feb. 14, 2018, which issued as U.S. Pat. No. 10,628,692 on Apr. 21, 2020, which claims the benefits of U.S. Provisional Patent Application No. 62/458,734, filed on Feb. 14, 2017, all of which have been incorporated by reference in their entirety.

FIELD OF INVENTION

The systems, methods, and apparatuses described herein relate to improved checkpoint security and control using computer-implemented techniques, and more particularly, toward the use of a multi-function biometric scanner.

BACKGROUND

For identification and security purposes, persons travelling via air, land, and/or water typically must pass through one or more checkpoints, at which their travel documents, such as driver licenses or passports, are verified. Border officers face challenges posed by a wide range of demographics. Travelers include people from all walks of life and of all ages. Some demographics, such as children, may pose no security threat while other demographics may pose higher security risks. The conventional way of verifying the travelers is to check each traveler's identification information (e.g., name, date of birth, etc.) against a watch list maintained in a computer database. If a traveler's identification matches an entry in the watch list, the traveler may receive special treatment, such as being further questioned, detained, rejected, and/or deported, etc.

Due to a variety of drawbacks, biometric scanners have not yet been widely adopted at security checkpoints. In addition to the high cost, the reading of multiple biometric features is a time consuming process that currently requires several scanning devices. As a result, although the verification of multiple biometrics may be desired, it has been too costly and cumbersome to implement. Moreover, and within travel contexts in particular, the large volume of travelers requires the completion of threat evaluations within very short timeframes (e.g., less than 45 seconds).

As border officers grapple with security decisions, they are often limited by the lack of technology. Accordingly, the systems, methods, and apparatuses described herein enable border officers to monitor multiple biometrics within very short timeframes.

SUMMARY OF THE INVENTION

Embodiments of the present invention are directed toward electronic devices configured to provide biometric monitoring at security checkpoints that substantially improve upon the related art.

Features and advantages of the embodiments are set forth in the description which follows, or will be apparent from the description, or may be learned by practice of the invention.

In one example, a multi-function biometric scanner includes a housing that includes a dome-shaped or semi-dome shaped user interface, the user interface including a capacitive film for fingerprint recognition that is disposed along an outer-surface of the housing, and a plurality of biometric sensors that are disposed within the housing and that are configured to retrieve a plurality of biometrics from a user, each sensor being configured to measure a respective biometric of a plurality of biometrics, wherein the plurality of biometrics are compared to identifying information that is stored in one or more databases.

In another example, the systems, methods, and instructions for operating a multi-function biometric scanner, include detecting a user's engagement with the multi-function biometric scanner, wherein the multi-function biometric scanner comprises a housing that includes a dome-shaped or semi-dome shaped user interface, the user interface including a capacitive film for fingerprint capture that is disposed along an outer-surface of the housing, concurrently detecting a plurality of biometrics of the user, wherein a plurality of biometric sensors are disposed within the housing and are configured to concurrently retrieve a plurality of biometrics from the user, each sensor being configured to measure a respective biometric of the plurality of biometrics, and comparing the plurality of biometrics to identifying information that is stored in one or more threat databases to identify a person of interest.

It is to be understood that both the foregoing general description and the following detailed description are exemplary and explanatory and are not intended to limit the invention to the described examples.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 5 illustrates a flow diagram of functionality for operating a multi-biometric scanner according to an example embodiment of the present invention.

DETAILED DESCRIPTION

A biometric scanner that is configured to selectively and/or concurrently (e.g., simultaneously) scan and verify multiple biometrics is provided. For example, the biometric scanner described herein may concurrently scan a plurality of biometrics for a user (e.g., traveler, concert-goer, employee, etc.), including hand prints for both hands (e.g., including palms and/or fingerprints), a picture of the traveler, an iris scan, thermal features or maps, and/or a voice recording for voice recognition purposes. By contrast, using known systems, each of these biometric features requires a separate and dedicated biometric scanner.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
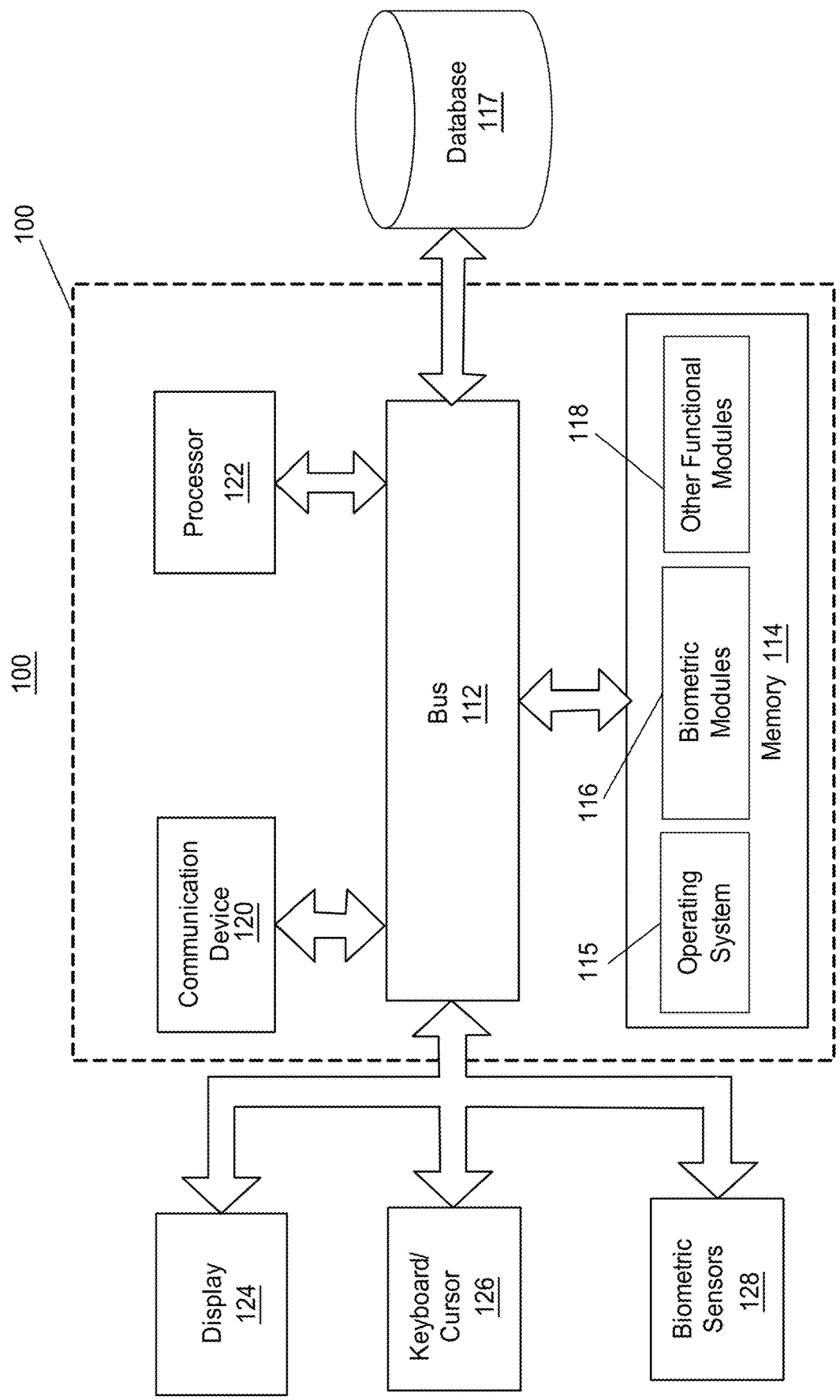
FIG. 1 is a block diagram of a computer server/system according to an example embodiment of the present invention.

FIG. 1 is a block diagram of a computer server/system 100 in accordance with an example embodiment of the present invention.

As shown in FIG. 1, system 100 may include a bus 112 and/or other communication mechanism(s) configured to communicate information between the various components of system 100, such as a processor 122 and a memory 114. In addition, a communication device 120 may enable connectivity between processor 122 and other devices by encoding data to be sent from processor 122 to another device over a network (not shown) and decoding data received from another system over the network for processor 122.

For example, communication device 120 may include a network interface card that is configured to provide wireless network communications. A variety of wireless communication techniques may be used including infrared, radio, Bluetooth, Wi-Fi, and/or cellular communications. Alternatively, communication device 120 may be configured to provide wired network connection(s), such as an Ethernet or USB connection.

Processor 122 may include one or more general or specific purpose processors to perform computation and control functions of system 100. Processor 122 may include a single integrated circuit, such as a micro-processing device, or may include multiple integrated circuit devices and/or circuit boards working in cooperation to accomplish the functions of processor 122.

System 100 may include memory 114 for storing information and instructions for execution by processor 122. Memory 114 may contain various components for retrieving, presenting, modifying, and storing data. For example, memory 114 may store software modules that provide functionality when executed by processor 122. The software modules may include an operating system 115 that provides operating system functionality for system 100. The software modules may further include biometric modules 116 configured to selectively and/or concurrently (e.g., simultaneously) scan and/or evaluate multiple types of biometric data, as well as other functional modules 118.

Biometric modules 116 are configured to scan and evaluate a plurality of biometrics of a user (e.g., a traveler, concert-goer, employee, etc.) using biometric sensors 128, including hand prints for one or both hands (e.g., including palm and/or fingerprints for one or more fingers), a picture of the traveler, an iris scan, thermal features, and a voice recording for voice recognition purposes. Biometric modules 116 may include one or more application program interfaces ("API") that enable officers at a security checkpoint to monitor the biometric information for individuals passing through the area.

Memory 114 may include a variety of computer-readable media that may be accessed by processor 122. For example, memory 114 may include any combination of random access memory ("RAM"), dynamic RAM ("DRAM"), static RAM ("SRAM"), read only memory ("ROM"), flash memory, cache memory, and/or any other type of non-transitory or transitory computer-readable medium.

Processor 122 is further coupled via bus 112 to a display 124, such as a liquid crystal display or wearable display. User input devices 126 that may include a keyboard and/or a cursor control device, such as a computer mouse, are further coupled to communication device 120 to enable a user to interface with transaction system 100.

System 100 may be part of a larger system. Therefore, system 100 may include one or more additional functional modules 118 to include additional functionality, such as other applications. Other functional modules 118 may include various modules for identifying a person of interest as described in U.S. Patent Application Publication No. 2014/0279640A1, which is incorporated by reference in its entirety.

A database 117 is coupled to bus 112 to provide centralized storage for biometric modules 116 and functional modules 118 and to store user identifying information and/or user threat data (e.g., traveler threat data). Database 117 may store data in an integrated collection of logically-related records or files. Database 117 may be an operational database, an analytical database, a data warehouse, a distributed database, an end-user database, an external database, a navigational database, an in-memory database, a document-oriented database, a real-time database, a relational database, an object-oriented database, or any other database known in the art.

Although illustrated as a single system, the functionality of system 100 may be implemented as a distributed system. Further, the functionality disclosed herein may be implemented on separate servers or devices that may be coupled together over a network. Further, one or more components of system 100 may not be included.

Figure 2:
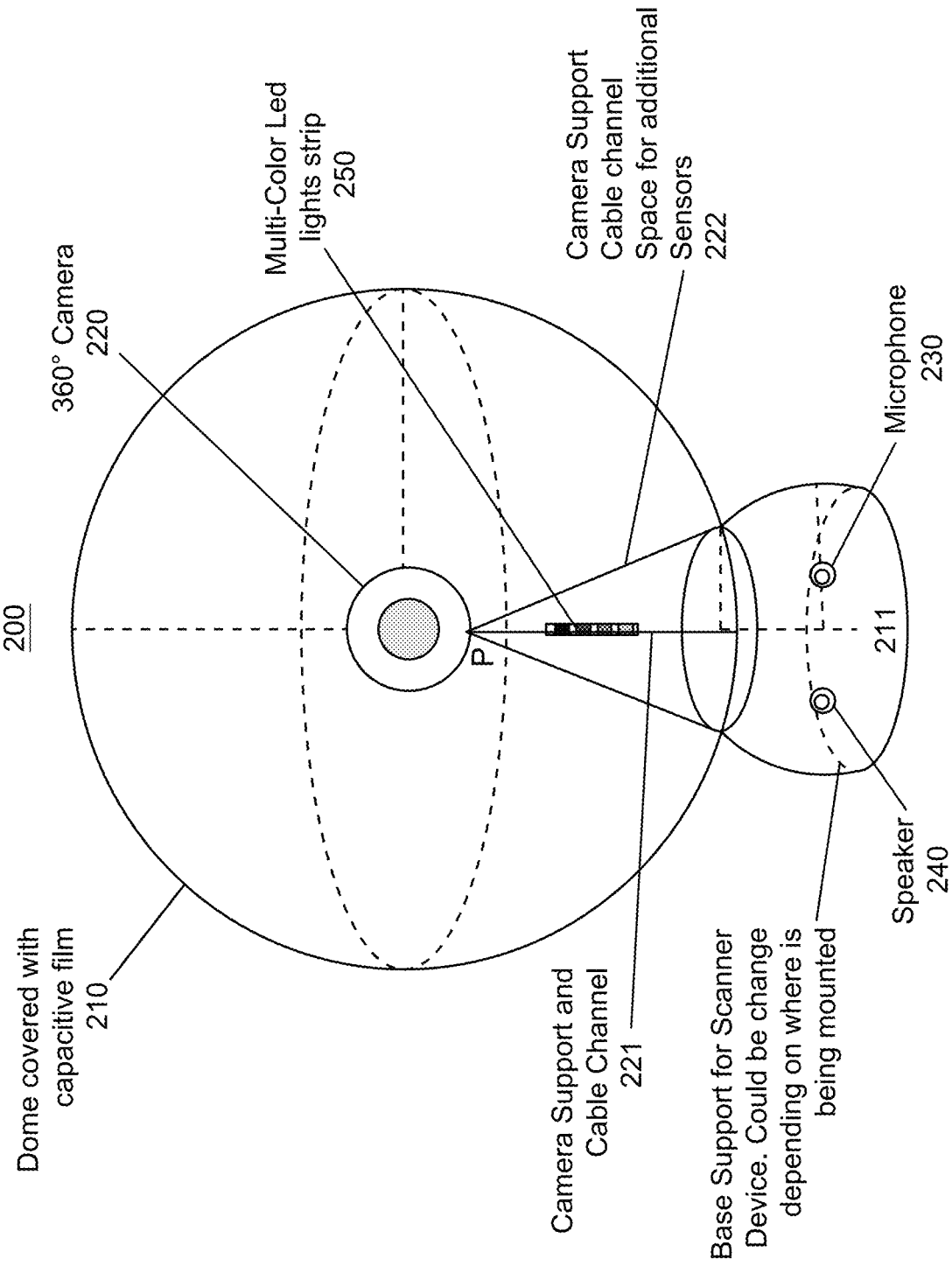
FIG. 2 illustrates a multi-biometric scanner having a dome-shaped configuration according to an example embodiment of the present invention.

FIG. 2 illustrates a multi-biometric scanner 200 having a dome-shaped configuration according to an example embodiment of the present invention. As shown in FIG. 2, multi-biometric scanner 200 includes a dome-shaped housing 210, housing base 211, imaging device 220, imaging device mounting structures 221, 222, microphone 230, speaker 240, and multi-color LED lights strip 250.

Multi-biometric scanner 200 includes a dome-shaped housing 210. Dome-shaped housing 210 may be formed of a transparent material, such as known glass or plastic materials. Dome-shaped housing 210 may further include an outer layer (not separately depicted in FIG. 2) that comprises a capacitive material that is configured to detect a traveler, such as live or touch detection. In a typical configuration, dome-shaped housing 210 may be formed of an insulating material, such as glass, that is coated with a transparent conductive material, such as indium tin oxide. Alternatively, one or more transparent electrically resistive layers may be used to detect touch.

Figure 3:
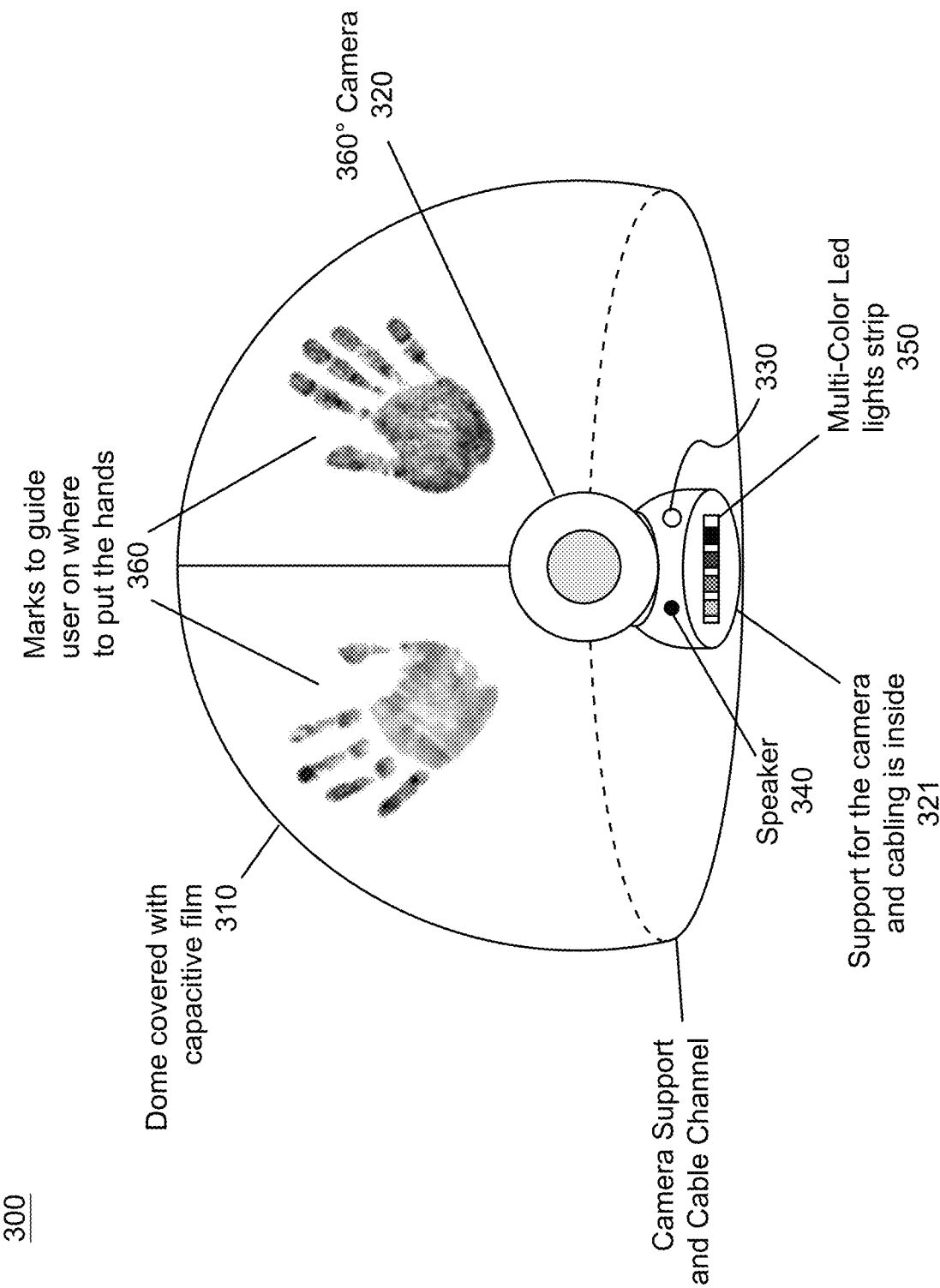
FIG. 3 illustrates a multi-biometric scanner having a semi-dome configuration according to an example embodiment of the present invention.

In an alternative configuration, dome-shaped housing 210 may be formed using a half-sphere or semi-dome structure, as shown in FIG. 3, instead of the spherical structure depicted in FIG. 2. The shape of the housing may vary depending on the mounting of the multi-biometric scanner 200 and the space available at a security checkpoint. Housing base 211 of multi-biometric scanner 200 may be configured to serve as support for the mounting, and may vary depending on where it is being mounted.

As shown in FIG. 2, multi-biometric scanner 200 may include one or more imaging devices 220. Imaging device 220 may include one or more high-resolution (e.g., 4 k or higher resolution) cameras, each covering a pre-defined range or angle of vision. For example, a 360 degree high-resolution camera may be used. In an alternative example, multiple 60, 90, 120 or 180 degree high-resolution cameras may be used. In some instances, imaging device 220 may further include thermal reading and/or mapping functionality. Alternatively, a dedicated thermal reader (not shown) may be used.

In an example configuration, four imaging devices may be used. First and second imaging devices may be used to capture the traveler's palm prints and fingerprints for respective left and right hands. Fingerprint images may be at least 500×500 pixels in a 1:1 aspect ratio, for example. A third imaging device may be dedicated to the traveler's face. Here, iris images may be at least 200×200 pixels in a 1:1 aspect ratio, for example. And, the facial image may be at least 120 pixels pupil-to-pupil in a 3:4 aspect ratio, for example. A fourth imaging device may be used to generate a thermal map of the traveler.

Also included within multi-biometric scanner 200 is a microphone 230 (e.g., a high-definition microphone) configured to record and to store the traveler's voice. In some configurations, multi-biometric scanner 200 further includes speaker 240 configured to provide verbal instructions to the user or traveler passing through the security checkpoint. In yet other configurations, one or more lights, including multiple color lights in the form of multi-color LED light strip 250, may be used to alert the user or the border officer to the different statuses on the device, depending on the color chosen. For example, a red-light indicator may indicate that a traveler requires further screening whereas a green-light indicator may indicate that a traveler presents no known threats.

The retrieved biometric information may be captured by the various sensors of multi-biometric scanner 200. In some embodiments, computed derivatives may be determined from the retrieved biometric images. Computed derivatives may be computed at multi-biometric scanner 200 to permit faster processing on, or reduced data size for data transfer. In some embodiments, device metadata may be appended to the biometric information which may be compiled into a single data package. Metadata may include image capture times, quality information, fingerprint minutiae, or speech-to-text of a voice sample. Metadata may also include information about the multi-biometric scanner itself, such as EXIF (Exchangeable image file format) data for images or items such as hardware, firmware, and/or driver versions. In addition to metadata, a biometric data package may include biometric images, one or more images from each biometric capture device (generally, 10 fingerprints, 2 irises, and 1 face; also may have voice sample, palms, or other images).

The biometrics concurrently detected by multi-biometric scanner 200 may be used to confirm the identity of a user or traveler by comparing the retrieved biometric information to information stored in one or more local or remote databases. Similarly, the biometrics concurrently detected by multi-biometric scanner 200 may be used to determine whether the user or traveler presents a threat by comparing the retrieved biometric information to information stored in one or more local or remote threat databases.

FIG. 3 illustrates a multi-biometric scanner 300 having a semi-dome configuration according to example embodiment of the present invention. Similar to the embodiment in depicted in FIG. 2, multi-biometric scanner 300 includes a semi-dome housing 310, microphone 330, speaker 340, and multi-color LED lights strip 350. In the semi-dome configuration, one or more indicators or marks 360 may be used to inform the traveler as to where to position their hands as the space is reduced. In addition, by using the semi-dome configuration, the structures of the housing base may be reduced.

Multi-biometric scanner 300 includes a semi-dome housing 310. Semi-dome housing 310 may be formed of a transparent material, such as known glass or plastic materials. Semi-dome housing 310 may further include an outer layer that comprises a capacitive material that is configured to detect a traveler, such as live or touch detection. In a typical configuration, semi-dome housing 310 may be formed of an insulating material, such as glass, that is coated with a transparent conductive material, such as indium tin oxide. Alternatively, one or more transparent electrically resistive layers may be used to detect touch.

Semi-dome housing 310 may include one or more imaging devices 320. Imaging device 320 may include one or more high resolution (e.g., 4 k or higher resolution) camera or multiple cameras, each covering a 60, 90, 120, or 180 degree angle of vision, which are held in place by support structure 321. In some instances, imaging device 220 may further include thermal reading functionality. Alternatively, a dedicated thermal reader may be used.

In an example configuration, four imaging devices may be used. First and second imaging devices may be used to capture the traveler's palm prints and fingerprints for respective left and right hands. Fingerprint images may be at least 500×500 pixels in a 1:1 aspect ratio, for example. A third imaging device may be dedicated to the traveler's face. Here, iris images may be at least 200×200 pixels in a 1:1 aspect ratio, for example. And, the facial image may be at least 120 pixels pupil-to-pupil in a 3:4 aspect ratio, for example. A fourth imaging device may be used to generate a thermal map of the traveler.

Also included within multi-biometric scanner 300 is a microphone 330 (e.g., a high-definition microphone) configured to record and to store the traveler's voice. In some configurations, multi-biometric scanner 300 further includes speaker 340 configured to provide verbal instructions to the user or traveler passing through the security checkpoint. In yet other configurations, one or more lights, including multiple color lights in the form of multi-color LED light strip 350, may be used to alert the user or the border officer to the different statuses on the device, depending on the color chosen. For example, a red-light indicator may indicate that a traveler requires further screening whereas a green-light indicator may indicate that a traveler presents no known threats.

Figure 4:
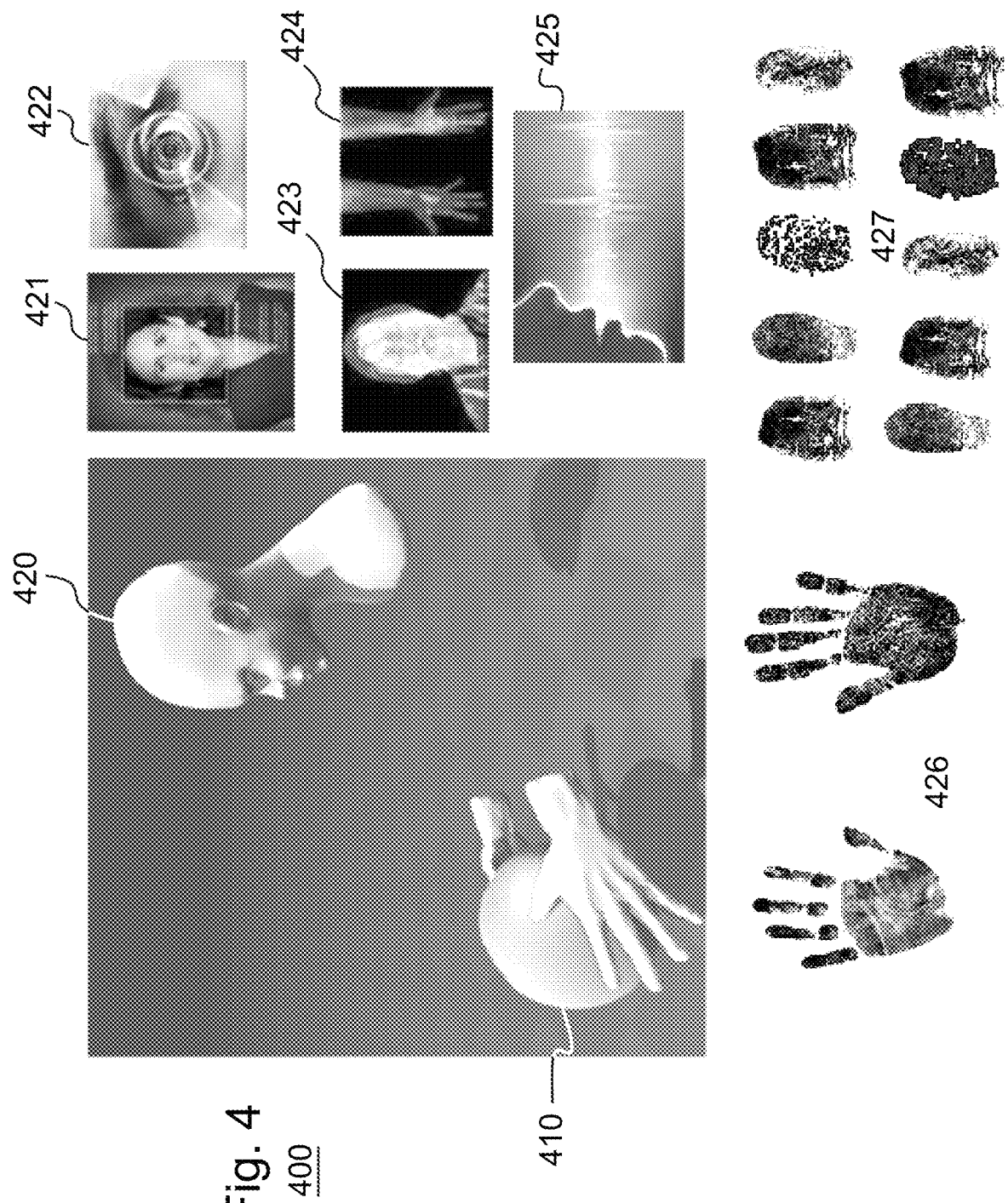
FIG. 4 illustrates a utilization of the multi-biometric scanner as well as various biometric characteristics that may be concurrently captured according to an example embodiment of the present invention.

FIG. 4 illustrates a utilization 400 of the multi-biometric scanner as well as various biometric characteristics that may be concurrently captured according to an example embodiment of the present invention. As shown in FIG. 4, utilization 400 includes multi-biometric scanner 410 configured to be held by a traveler or user 420. Also shown in FIG. 4 are visual representations of a variety of biometrics captured by multi-biometric scanner 410, including images of the user's face 421 and iris 422, thermal images of the user's face 423 and hands and/or arms 424, recording of the user's voice 425, and hand/palm and finger prints 426, 427.

As shown in FIG. 4, multi-biometric scanner 410 of the present invention provides a simultaneous approach to make multiple biometric readings based upon multiple different biometric characteristics of user 420. For example, user 420 may put both hands over the dome-shaped housing of multi-biometric scanner 410. Multi-biometric scanner 410 may be covered with a capacitive film that is configured to perform touch detection. In other words, biometrics may be read upon detection of the user's palms, or upon detection of user 420 within close proximity. Biometric information may be read at a distance. After user 420 is detected, multi-biometric scanner 410, using one or more imaging devices (e.g., high resolution cameras and/or thermal cameras as discussed in connection with FIGS. 2 and 3), takes images of the user's palms, face, iris, and/or thermal readings for local and/or remote processing. Additionally, multi-biometric scanner 410 can record the user's voice for voice recognition purposes.

Multi-biometric scanner 410 may send all or selected images to a graphic or thermal processor (not shown) in order to separate the different components and then perform the feature extraction of the different biometric characteristics taken as well the template generation for those biometric components. The extracted features and biometric characteristics are then used to confirm the identity of the user using one or more local or remote databases.

FIG. 5 illustrates a flow diagram of functionality 500 for operating a multi-biometric scanner according to an example embodiment of the present invention. In some instances, functionality 500 of the flow diagram of FIG. 5 is implemented by software stored in memory or other computer readable or tangible media, and executed by a processor. In other instances, the functionality may be performed by hardware (e.g., through the use of an application specific integrated circuit ("ASIC"), a programmable gate array ("PGA"), a field programmable gate array ("FPGA"), etc.), or any combination of hardware and software.

At the outset, functionality 500 may detect a user's engagement with the multi-function biometric scanner, at 510. The multi-function biometric scanner includes a housing that includes a dome-shaped or semi-dome shaped user interface. The user interface may include a capacitive film for fingerprint capture that is disposed along an outer-surface of the housing that is capable of detecting a user's engagement.

Next, at 520, functionality 500 concurrently detects a plurality of biometrics of the user. A plurality of biometric sensors that are disposed within the housing and are configured to concurrently retrieve a plurality of biometrics from the user. Each sensor may be configured to measure a respective biometric of the plurality of biometrics. The plurality of biometric sensors may include one or more high resolution imaging devices configured to capture palm prints, finger prints, facial images, iris images, and/or thermal images. The plurality of biometric sensors may include a voice capture device.

Lastly, at 530, each of the plurality of biometrics is compared to identifying information that is stored in one or more databases. For example, a person of interest may be identified using information that is stored in a threat database.

A biometric scanner that is configured to selectively and/or concurrently (e.g., simultaneously) scan and verify multiple biometrics is provided. By employing the embodiments described herein, a multi-biometric scanner that is configured to selectively and/or concurrently scan and verify multiple biometrics is provided. The embodiments of the invention may be used at automated border control devices or entry control devices, such as immigration kiosks, electronic gates, or manned posts, for example. Although example configurations have been described, the embodiments of the invention are not so limited. For example, an alternative configuration may include using other scanning techniques such as multispectral or ultrasound imaging. In another alternative example, the embodiments of the invention may be applied to a one-hand scanner.

One having ordinary skill in the art will readily understand that the invention as discussed above may be practiced with steps in a different order, and/or with elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A multi-function biometric scanner comprising:
   a housing that includes a dome-shaped or semi-dome shaped user interface; and
   a plurality of biometric sensors that are disposed within the housing and that are configured to concurrently retrieve a plurality of biometrics from a user, each biometric sensor being configured to measure a respective biometric of the plurality of biometrics,
   wherein the plurality of biometric sensors include one or more high resolution imaging devices configured to capture facial images, iris images, and/or thermal images and the plurality of biometrics are compared to identifying information that is stored in one or more databases.

2. The multi-function biometric scanner according to claim 1, wherein the plurality of biometric sensors include a voice capture device.

3. The multi-function biometric scanner according to claim 1, wherein the multi-function biometric scanner is communicatively coupled to one or more threat databases.

4. The multi-function biometric scanner according to claim 1, wherein the capacitive film for fingerprint capture detects user engagement with the multi-function biometric scanner.

5. A method for operating a multi-function biometric scanner, the method comprising:
   detecting a user's engagement with the multi-function biometric scanner, wherein the multi-function biometric scanner comprises a housing that includes a dome-shaped or semi-dome shaped user interface;
   concurrently detecting a plurality of biometrics of the user, wherein a plurality of biometric sensors include one or more high resolution imaging devices configured to capture facial images, iris images, and/or thermal images and the plurality of biometric sensors are disposed within the housing and are configured to concurrently retrieve a plurality of biometrics from the user, each biometric sensor being configured to measure a respective biometric of the plurality of biometrics; and
   comparing the plurality of biometrics to identifying information that is stored in one or more threat databases to identify a person of interest.

6. The method according to claim 5, wherein the plurality of biometric sensors include a voice capture device.

7. The method according to claim 5, wherein the multi-function biometric scanner is communicatively coupled to one or more threat databases.

8. The method according to claim 5, wherein the capacitive film for fingerprint capture detects user engagement with the multi-function biometric scanner.

9. A non-transitory computer readable storage medium storing one or more programs configured to be executed by a processor, the one or more programs comprising instructions for:
   detecting a user's engagement with the multi-function biometric scanner, wherein the multi-function biometric scanner comprises a housing that includes a dome-shaped or semi-dome shaped user interface;

concurrently detecting a plurality of biometrics of the user, wherein a plurality of biometric sensors include one or more high resolution imaging devices configured to capture facial images, iris images, and/or thermal images and the plurality of biometric sensors are disposed within the housing and are configured to concurrently retrieve a plurality of biometrics from the user, each biometric sensor being configured to measure a respective biometric of the plurality of biometrics; and comparing the plurality of biometrics to identifying information that is stored in one or more threat databases to identify a person of interest.

10. The non-transitory computer readable storage medium according to claim 9, wherein the plurality of biometric sensors include a voice capture device.

11. The non-transitory computer readable storage medium according to claim 9, wherein the multi-function biometric scanner is communicatively coupled to one or more threat databases.

12. The non-transitory computer readable storage medium according to claim 9, wherein the capacitive film for fingerprint capture detects user engagement with the multi-function biometric scanner.

13. A device comprising:
a processor; and
a non-transitory memory storing one or more programs for execution by the processor, the one or more programs including instructions for:

detecting a user's engagement with the multi-function biometric scanner, wherein the multi-function biometric scanner comprises a housing that includes a dome-shaped or semi-dome shaped user interface;

concurrently detecting a plurality of biometrics of the user, wherein a plurality of biometric sensors include one or more high resolution imaging devices configured to capture facial images, iris images, and/or thermal images and the plurality of biometric sensors are disposed within the housing and are configured to concurrently retrieve a plurality of biometrics from the user, each biometric sensor being configured to measure a respective biometric of the plurality of biometrics; and comparing the plurality of biometrics to identifying information that is stored in one or more threat databases to identify a person of interest.

14. The device according to claim 13, wherein the plurality of biometric sensors include a voice capture device.

15. The device according to claim 13, wherein the multi-function biometric scanner is communicatively coupled to one or more threat databases.

16. The device according to claim 13, wherein the capacitive film for fingerprint capture detects user engagement with the multi-function biometric scanner.

* * * * *